UNITED STATES PATENT OFFICE.

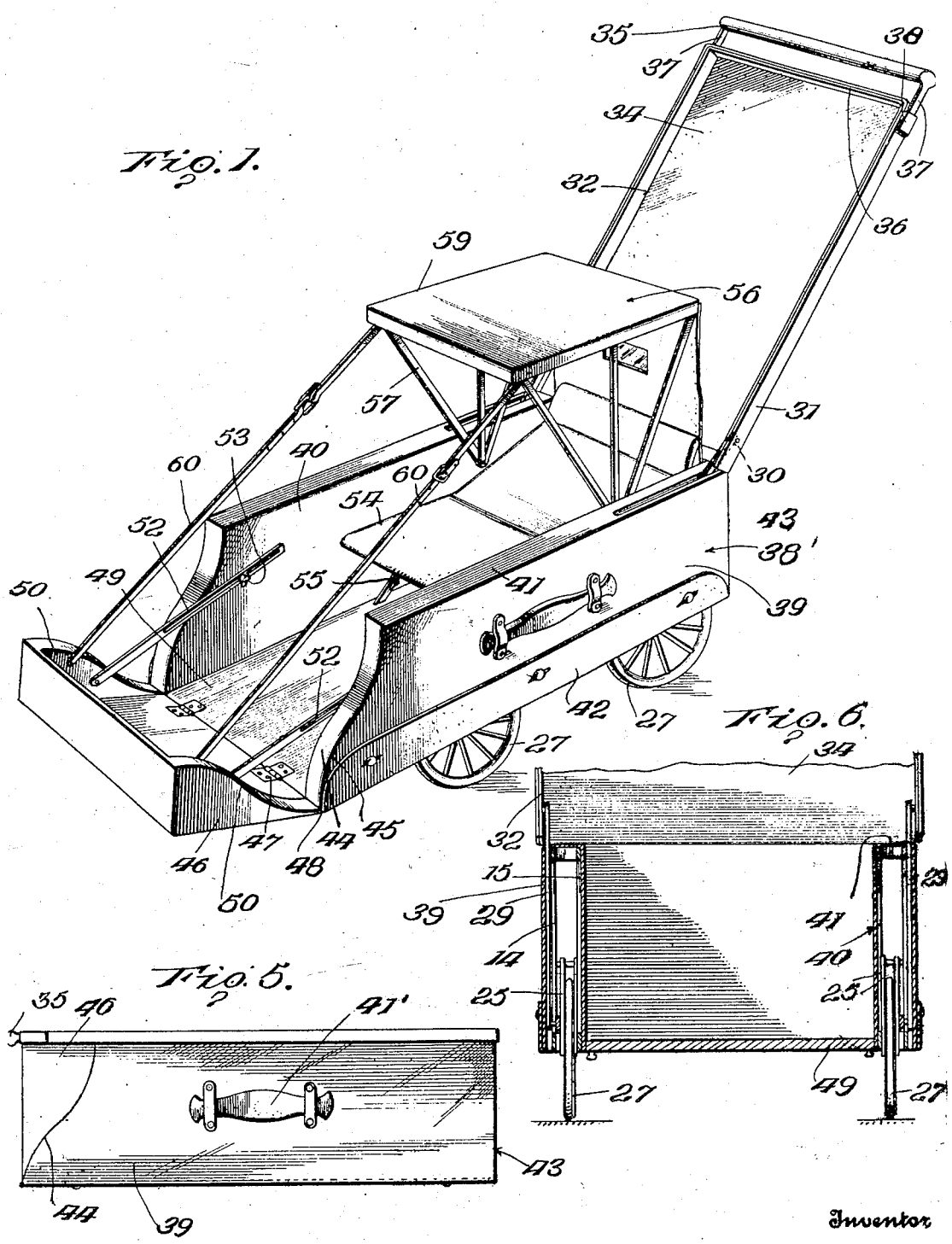

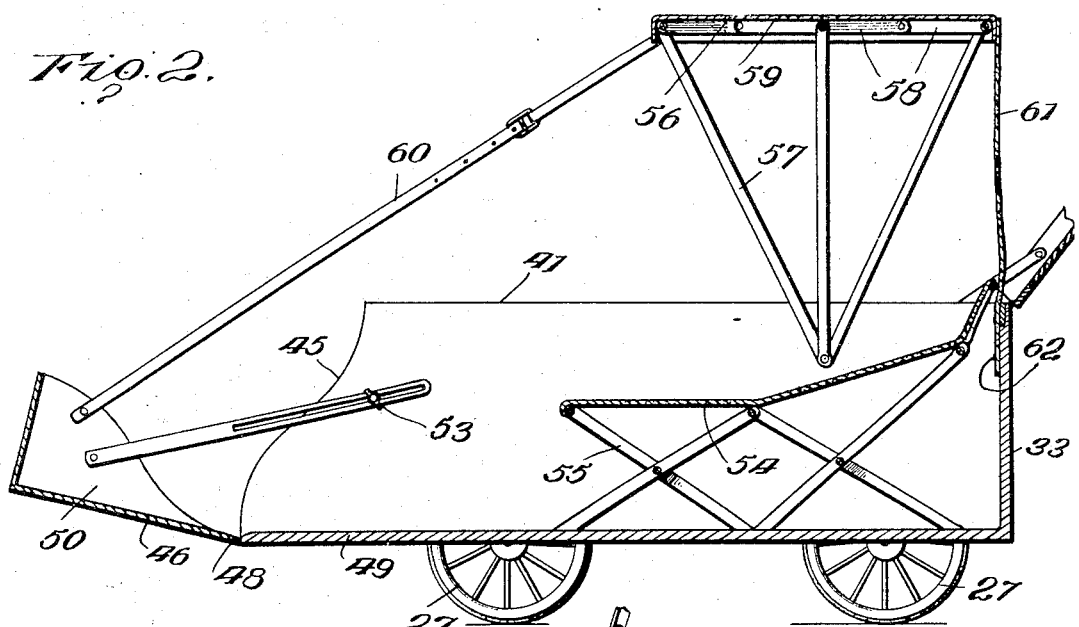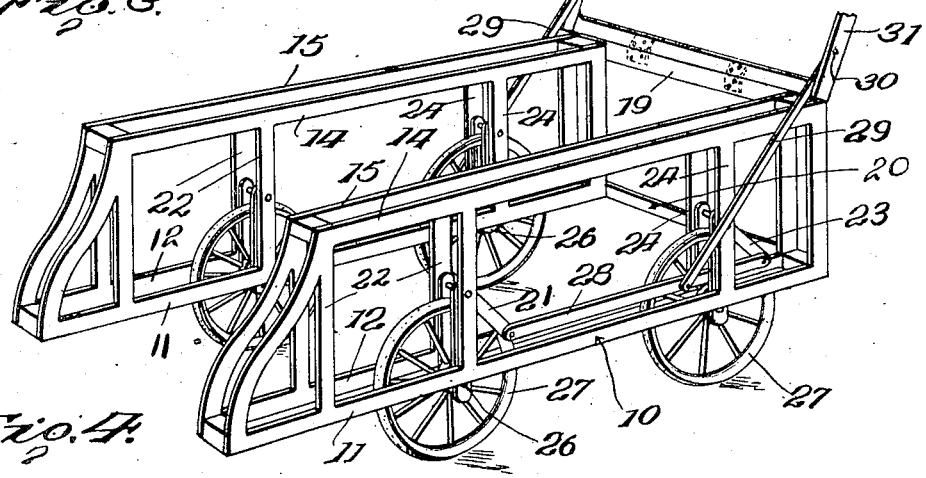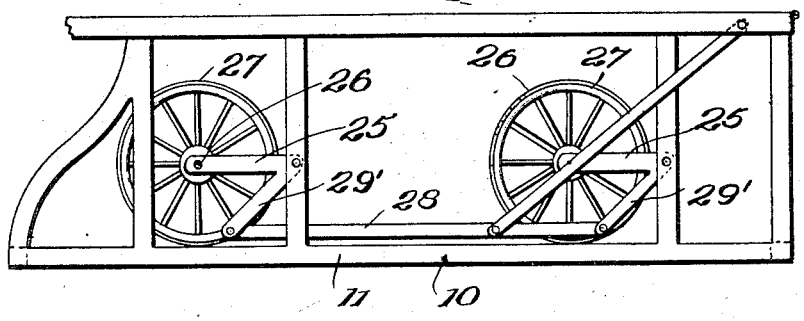

JOHN G. BAILEY, OF EAST LIVERPOOL, OHIO, ASSIGNOR OF ONE-THIRD TO WESLEY HOWELL AND ONE-THIRD TO CHARLES H. BENCE, OF EAST LIVERPOOL, OHIO.

FOLDING GO-CART.

1,125,441.      Specification of Letters Patent.      Patented Jan. 19, 1915.

Application filed November 25, 1912. Serial No. 733,460.

*To all whom it may concern:*

Be it known that I, JOHN G. BAILEY, a citizen of the United States, residing at East Liverpool, in the county of Columbiana and State of Ohio, have invented certain new and useful Improvements in Folding Go-Carts, of which the following is a specification.

This invention relates to an improvement in folding go-carts.

The primary object of the invention is to provide a go-cart which may be folded to occupy comparatively small space.

A further object of the invention is to provide a folding cart construction with a frame mechanism which will have the appearance of a valise or suit case when the cart is folded, the cart being housed within the suit case.

Another object of the invention is to provide a construction in which the wheels of the cart when folded are maintained in the same plane as when the cart is in use.

A still further object of the invention is to provide a construction which will be light and durable and which, while readily folded, may be maintained in its extended position without danger of accidental folding.

Another object of the invention is to provide a wheel housing mechanism in which the cart may be carried without danger of the dirt accumulated by the wheels contacting with the clothes of the person carrying the same.

In the drawings: Figure 1 is a perspective view; Fig. 2 is a longitudinal section; Fig. 3 is a perspective view of the frame, the wheels being shown in extended position; Fig. 4 is a side elevation, the wheels being shown in their closed position; Fig. 5 is a side elevation, the cart being folded; and Fig. 6 is a transverse section.

In the drawings 10 designates a frame each side of which consists of two sets of longitudinally disposed spaced beams arranged one above the other, the lower set of beams 11 and 12 being connected to the upper set of beams 14 and 15 by spaced standards 22 and 24 which are arranged adjacent the ends and at intermediate points of the frame. Both sides of the frame are formed in this manner, the sides being connected at their rear ends by the upper and lower bars 19 and 20. A bell crank lever 21 is supported between the spaced vertical standards 22, and a bell crank lever 23 is supported between the spaced vertical standards 24. The long arms 25 of each of these bell crank levers, which are four in number, support the stub shafts 26 on which the wheels 27 are mounted. A link 28 connects the short arms 29' of the bell cranks on each side of the frame. It will be noted that longitudinal movement of the link 28 will raise and lower the long arms 25 of the bell cranks, bringing the wheels either into the position shown in Fig. 3 where they may contact with the ground, or into the position shown in Fig. 4 where they are housed between the spaced members of the frame at its sides. A link 29 is pivotally connected to the link 28 intermediate its ends, said link being pivotally connected at the point 30 with the longitudinal members 31 of the frame 32 which is hingedly supported on the wall 33 of the casing, which is secured to the rear transverse members of the frame. A top or closure 34 is supported within the frame 32, a handle 35 being supported parallel with the transverse portion 36 of the frame 32, the handle being formed with portions 37 which extend within sockets 38, the handle in this manner being adjustable with respect to the top. Thus, if the top is not of sufficient length to be readily grasped by the hands of the operator, the handle may be drawn outward with respect to the top, being lengthened or shortened in proportion to the height from which it is desired to push the vehicle.

Each of the side portions of the frame are housed by a casing 38' which consists of the outer side walls 39, the inner side walls 40, the upper and lower edge members 41 and 42, and the end walls 43 and 44. One of the side members is provided with a handle 41' by means of which the casing may be carried when the cart is not in use. The front end members 44 are curved as at 45 to give the cart when open the general appearance of the usual form of go-cart or perambulator. A front section 46 is hingedly supported at the point 47 at the front edge 48 of the bottom section 49 which is secured to the base of the frame, the side walls 50 of the end section 46 being curved to conform to the curvature of the front ends of the side members of the casing, the front section folding on the side section. Links 52 are pivotally connected to the side walls of the end member 46, said links having a sliding connection with the inner walls of the side walls of the casing, a wing-nut 53 holding them in their adjusted positions. By this construction it will be noted that the front section 46 may be maintained in its extended position and that when it is desired to fold the cart the wing-nut 53 may be loosened and the section moved until its curved walls contact with the curved forward ends of the side sections. A body support 54 is arranged within the casing, being supported by the legs 55. It will be noted that while this body support is shown as consisting of pivotally connected legs to which is secured a covering, any suitable form of support may be used. A canopy 56 is supported by the side walls of the casing, the standards 57 being pivoted to the side walls of the casing and supporting a plurality of pivotally connected links 58 at their upper diverging ends, on which is arranged a covering 59. Straps 60 connect the front ends of the forward pair of links with the front portion 46 of the casing, the canopy being properly supported in its extended position when the front portion 46 is extended. The canopy is provided with a back curtain 61 which is secured at the point 62 to the rear wall 33 of the casing, forming an effectual rear closure for the cart when in its extended position. With the cart in its folded position, the cover 34, which may be secured to the end sections 46 in any suitable manner, is swung on its pivot, the longitudinal members 32 of the frame, which constitute the handle, contacting with the upper walls 41 of side members 38. This movement of the frame 32 forces the link 28 rearwardly of the frame, and the long arms 25 of the bell cranks are caused to assume a position at right angles to that at which they are disposed when the cart is in use, the wheels in this manner being lifted off the ground and disposed between the sections of the frame which constitute the side walls. Particular attention is called to the fact that the bell crank levers are of such a length and are so pivoted that when the bell cranks are moved to their position to support the wheels in contact with the ground or in a position where the wheels are folded within the side walls, they cannot move except by manipulation of the lever which is connected to the handle.

The many advantages of a construction of this character will be clearly apparent, as it will be noted that the entire construction is such as may be easily and economically manufactured and that the various parts are readily assembled.

Having described the invention, what I claim as new is:

1. A folding go-cart including a casing, said casing having hollow side walls, wheels pivotally supported within the side walls, a cover for the casing, a connection between said cover and the wheels whereby movement of the cover will move the wheels into and out of the hollow walls of the casing, a hingedly supported end wall, a folding hood supported by the side walls, and a connection between said hood and said end wall whereby when the end wall is brought to its open position the hood will be held against folding.

2. A folding go-cart including a casing, said casing having hollow side walls, wheels pivotally supported within the side walls, a cover for the casing, a connection between said cover and the wheels whereby movement of the cover will move the wheels into and out of the hollow walls of the casing, a hingedly supported end wall, a folding hood supported by the side walls, and a flexible connection between said hood and said end wall whereby when the end wall is brought to its open position the hood will be held against folding.

3. A folding go-cart including a body casing, vertical standards carried by the body, spaced bell cranks pivotally supported by each pair of standards, wheels journaled by said bell cranks, a link connection between the terminals of one pair of bell cranks and the terminals of an adjacent pair of bell cranks, and a closure comprising a handle which when moved to its position to be used as a handle actuates the bell cranks to move the wheels with respect to the frames.

4. A foldable go-cart including a body casing having hollow side walls, a hinged cover for the casing, pairs of spaced bell-crank levers pivoted within the side walls, a wheel journaled in each pair of levers, a link pivotally connecting the levers, and a link pivotally connecting said first link to the cover whereby the movement of the cover into open position will project the wheels to a position exteriorly of the side walls, and the movement of the cover into closed position will draw the wheels up into the side walls.

5. A foldable go-cart including a body casing having hollow side walls, a hinged cover for the casing, wheels pivotally journaled within each side wall, a link pivotally connecting the wheels of each side wall, and a link pivotally connecting the said first link to the cover, whereby the movement of the cover into open or closed position will swing the first-mentioned link to project the wheels from the side walls, or swing them up to a position within the side walls.

6. A foldable go-cart including a body casing having hollow side walls, a hinged cover for the casing, pairs of bell-crank levers pivoted within the side walls, wheels journaled between the pairs of levers, means pivotally connecting the pairs of levers of each side wall, and means pivotally connecting said first-mentioned means to the cover, whereby the cover, when moved into open or closed position, will correspondingly and simultaneously oscillate the first-mentioned means to project the wheels from the side walls or to draw them up within the side walls.

In testimony whereof I affix my signature in presence of two witnesses.

JOHN G. BAILEY. [L. S.]

Witnesses:
GROVER A. GREEN,
HATTIE HAPGOOD.